United States Patent
Ahn et al.

(10) Patent No.: US 9,509,652 B2
(45) Date of Patent: Nov. 29, 2016

(54) METHOD AND SYSTEM FOR DISPLAYING SIMILAR EMAIL MESSAGES BASED ON MESSAGE CONTENTS

(71) Applicant: CommVault Systems, Inc., Oceanport, NJ (US)

(72) Inventors: Jun H. Ahn, Manalapan, NJ (US); David Ngo, Shrewsbury, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 465 days.

(21) Appl. No.: 13/759,283

(22) Filed: Feb. 5, 2013

(65) Prior Publication Data

US 2013/0151640 A1    Jun. 13, 2013

Related U.S. Application Data

(62) Division of application No. 12/548,953, filed on Aug. 27, 2009, now Pat. No. 8,370,442.

(60) Provisional application No. 61/093,148, filed on Aug. 29, 2008.

(51) Int. Cl.
| | | |
|---|---|---|
| *G06F 15/16* | (2006.01) | |
| *H04L 12/58* | (2006.01) | |
| *G06F 17/30* | (2006.01) | |
| *G06Q 10/10* | (2012.01) | |
| *G06F 11/14* | (2006.01) | |

(52) U.S. Cl.
CPC ......... *H04L 51/24* (2013.01); *G06F 17/30368* (2013.01); *G06Q 10/107* (2013.01); *G06F 11/1446* (2013.01)

(58) Field of Classification Search
CPC .............................. G06Q 10/107; H04L 51/24
USPC .................................. 709/206–207, 223–224
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 13/894,010, filed May 14, 2013, Pawar.

(Continued)

*Primary Examiner* — Bharat N Barot
(74) *Attorney, Agent, or Firm* — Perkins Coie LLP

(57) ABSTRACT

A method and system for identifying changes to a data set, such as data within a mailbox, and performing actions based on the identified changes is discussed. In some examples, the system receives an indication of a change to a mailbox, creates a change journal entry for the change, and identifies data to be copied via the change journal entry. In some examples, the system leverages the change journal to associate messages with changes to a mailbox.

18 Claims, 8 Drawing Sheets

(56) References Cited

U.S. PATENT DOCUMENTS

| | | | |
|---|---|---|---|
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,590,318 A | 12/1996 | Zbikowski et al. |
| 5,619,644 A | 4/1997 | Crockett et al. |
| 5,623,679 A | 4/1997 | Rivette et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,918,232 A | 6/1999 | Pouschine et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,006,225 A | 12/1999 | Bowman et al. |
| 6,021,415 A | 2/2000 | Cannon et al. |
| 6,023,710 A | 2/2000 | Steiner et al. |
| 6,026,414 A | 2/2000 | Anglin |
| 6,052,735 A | 4/2000 | Ulrich et al. |
| 6,061,692 A | 5/2000 | Thomas et al. |
| 6,076,148 A | 6/2000 | Kedem |
| 6,088,697 A | 7/2000 | Crockett et al. |
| 6,092,062 A | 7/2000 | Lohman et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,499,026 B1 | 12/2002 | Rivette et al. |
| 6,507,852 B1 | 1/2003 | Dempsey et al. |
| 6,516,314 B1 | 2/2003 | Birkler et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,772,164 B2 | 8/2004 | Reinhardt |
| 6,775,790 B2 | 8/2004 | Reuter et al. |
| 6,785,864 B1 | 8/2004 | Te et al. |
| 6,829,635 B1* | 12/2004 | Townshend ............... 709/206 |
| 6,834,329 B2 | 12/2004 | Sasaki et al. |
| 6,836,779 B2 | 12/2004 | Poulin |
| 6,847,984 B1 | 1/2005 | Midgley et al. |
| 6,857,053 B2 | 2/2005 | Bolik et al. |
| 6,871,163 B2 | 3/2005 | Hiller et al. |
| 6,886,020 B1 | 4/2005 | Zahavi et al. |
| 6,947,935 B1 | 9/2005 | Horvitz et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,047,236 B2 | 5/2006 | Conroy et al. |
| 7,085,787 B2 | 8/2006 | Beier et al. |
| 7,103,740 B1 | 9/2006 | Colgrove et al. |
| 7,130,860 B2 | 10/2006 | Pachet et al. |
| 7,130,970 B2 | 10/2006 | Devassy et al. |
| 7,149,750 B2 | 12/2006 | Chadwick |
| 7,165,082 B1 | 1/2007 | DeVos |
| 7,167,895 B1 | 1/2007 | Connelly |
| 7,171,619 B1 | 1/2007 | Bianco |
| 7,181,444 B2 | 2/2007 | Porter et al. |
| 7,194,454 B2 | 3/2007 | Hansen et al. |
| 7,197,502 B2 | 3/2007 | Feinsmith |
| 7,200,726 B1 | 4/2007 | Gole et al. |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,269,612 B2 | 9/2007 | Devarakonda et al. |
| 7,272,606 B2 | 9/2007 | Borthakur et al. |
| 7,330,997 B1 | 2/2008 | Odom |
| 7,343,365 B2 | 3/2008 | Farnham et al. |
| 7,346,623 B2 | 3/2008 | Prahlad et al. |
| 7,346,676 B1 | 3/2008 | Swildens et al. |
| 7,356,657 B2 | 4/2008 | Mikami |
| 7,356,660 B2 | 4/2008 | Matsunami et al. |
| 7,359,917 B2 | 4/2008 | Winter et al. |
| 7,366,859 B2 | 4/2008 | Per et al. |
| 7,386,663 B2 | 6/2008 | Cousins |
| 7,395,282 B1 | 7/2008 | Crescenti et al. |
| 7,430,587 B2 | 9/2008 | Malone et al. |
| 7,433,301 B2 | 10/2008 | Akahane et al. |
| 7,440,966 B2 | 10/2008 | Adkins et al. |
| 7,440,984 B2 | 10/2008 | Augenstein et al. |
| 7,454,569 B2 | 11/2008 | Kavuri et al. |
| 7,496,589 B1 | 2/2009 | Jain et al. |
| 7,500,150 B2 | 3/2009 | Sharma et al. |
| 7,509,316 B2 | 3/2009 | Greenblatt et al. |

(56) References Cited

U.S. PATENT DOCUMENTS

| | | |
|---|---|---|
| 7,512,601 B2 | 3/2009 | Cucerzan et al. |
| 7,512,814 B2 | 3/2009 | Chen et al. |
| 7,529,748 B2 | 5/2009 | Wen et al. |
| 7,532,340 B2 | 5/2009 | Koppich et al. |
| 7,533,103 B2 | 5/2009 | Brendle et al. |
| 7,533,181 B2 | 5/2009 | Dawson et al. |
| 7,533,230 B2 | 5/2009 | Glover et al. |
| 7,583,861 B2 | 9/2009 | Hanna et al. |
| 7,584,227 B2 | 9/2009 | Gokhale et al. |
| 7,590,997 B2 | 9/2009 | Diaz Perez |
| 7,613,728 B2 | 11/2009 | Png et al. |
| 7,613,752 B2 | 11/2009 | Prahlad et al. |
| 7,617,541 B2 | 11/2009 | Plotkin et al. |
| 7,620,710 B2 | 11/2009 | Kottomtharayil et al. |
| 7,624,443 B2 | 11/2009 | Kramer et al. |
| 7,627,598 B1 | 12/2009 | Burke |
| 7,627,617 B2 | 12/2009 | Kavuri et al. |
| 7,631,151 B2 | 12/2009 | Prahlad et al. |
| 7,634,478 B2 | 12/2009 | Yang et al. |
| 7,657,550 B2 | 2/2010 | Prahlad et al. |
| 7,660,800 B2 | 2/2010 | Prahlad et al. |
| 7,660,807 B2 | 2/2010 | Prahlad et al. |
| 7,668,798 B2 | 2/2010 | Scanlon et al. |
| 7,668,884 B2 | 2/2010 | Prahlad et al. |
| 7,672,962 B2 | 3/2010 | Arrouye et al. |
| 7,693,856 B2 | 4/2010 | Arrouye et al. |
| 7,707,178 B2 | 4/2010 | Prahlad et al. |
| 7,711,700 B2 | 5/2010 | Prahlad et al. |
| 7,716,171 B2 | 5/2010 | Kryger |
| 7,716,191 B2 | 5/2010 | Blumenau et al. |
| 7,720,801 B2 | 5/2010 | Chen |
| 7,725,605 B2 | 5/2010 | Palmeri et al. |
| 7,725,671 B2 | 5/2010 | Prahlad et al. |
| 7,734,593 B2 | 6/2010 | Prahlad et al. |
| 7,734,669 B2 | 6/2010 | Kottomtharayil et al. |
| 7,734,715 B2 | 6/2010 | Hyakutake et al. |
| 7,747,579 B2 | 6/2010 | Prahlad et al. |
| 7,756,837 B2 | 7/2010 | Williams et al. |
| 7,801,864 B2 | 9/2010 | Prahlad et al. |
| 7,818,215 B2 | 10/2010 | King et al. |
| 7,822,749 B2 | 10/2010 | Prahlad et al. |
| 7,831,553 B2 | 11/2010 | Prahlad et al. |
| 7,831,622 B2 | 11/2010 | Prahlad et al. |
| 7,831,795 B2 | 11/2010 | Prahlad et al. |
| 7,840,537 B2 | 11/2010 | Gokhale et al. |
| 7,840,619 B2 | 11/2010 | Horn |
| 7,841,011 B2 | 11/2010 | Manson et al. |
| 7,849,059 B2 | 12/2010 | Prahlad et al. |
| 7,882,077 B2 | 2/2011 | Gokhale et al. |
| 7,882,098 B2 | 2/2011 | Prahlad et al. |
| 7,890,467 B2 | 2/2011 | Watanabe et al. |
| 7,890,469 B1 | 2/2011 | Maionchi et al. |
| 7,925,856 B1 | 4/2011 | Greene |
| 7,933,920 B2 | 4/2011 | Kojima et al. |
| 7,937,365 B2 | 5/2011 | Prahlad et al. |
| 7,937,393 B2 | 5/2011 | Prahlad et al. |
| 7,962,709 B2 | 6/2011 | Agrawal |
| 7,966,495 B2 | 6/2011 | Ackerman et al. |
| 8,010,769 B2 | 8/2011 | Prahlad et al. |
| 8,028,026 B2 * | 9/2011 | Jain ............ G06Q 10/107 709/206 |
| 8,037,031 B2 | 10/2011 | Gokhale et al. |
| 8,041,677 B2 | 10/2011 | Sumner et al. |
| 8,051,045 B2 | 11/2011 | Vogler |
| 8,051,095 B2 | 11/2011 | Prahlad et al. |
| 8,055,650 B2 | 11/2011 | Scanlon et al. |
| 8,055,745 B2 | 11/2011 | Atluri |
| 8,086,569 B2 | 12/2011 | Jasrasaria |
| 8,117,196 B2 | 2/2012 | Jones et al. |
| 8,140,786 B2 | 3/2012 | Bunte et al. |
| 8,170,995 B2 | 5/2012 | Prahlad et al. |
| 8,190,571 B2 | 5/2012 | Sen et al. |
| 8,219,524 B2 | 7/2012 | Gokhale |
| 8,229,954 B2 | 7/2012 | Kottomtharayil et al. |
| 8,234,249 B2 | 7/2012 | Prahlad et al. |
| 8,271,548 B2 | 9/2012 | Prahlad et al. |
| 8,285,964 B2 | 10/2012 | Prahlad et al. |
| 8,401,996 B2 | 3/2013 | Muller et al. |
| 8,442,983 B2 | 5/2013 | Pawar |
| 2001/0047365 A1 | 11/2001 | Yonaitis |
| 2002/0049626 A1 | 4/2002 | Mathias et al. |
| 2002/0069324 A1 | 6/2002 | Gerasimov et al. |
| 2002/0087550 A1 | 7/2002 | Carlyle et al. |
| 2002/0147734 A1 | 10/2002 | Shoup et al. |
| 2002/0161753 A1 | 10/2002 | Inaba et al. |
| 2003/0018607 A1 | 1/2003 | Lennon et al. |
| 2003/0046313 A1 | 3/2003 | Leung et al. |
| 2003/0101183 A1 | 5/2003 | Kabra et al. |
| 2003/0130993 A1 | 7/2003 | Mendelevitch et al. |
| 2003/0182583 A1 | 9/2003 | Turco |
| 2003/0196052 A1 | 10/2003 | Bolik et al. |
| 2004/0015514 A1 | 1/2004 | Melton et al. |
| 2004/0181586 A1 * | 9/2004 | Morreale et al. ............ 709/206 |
| 2004/0254919 A1 | 12/2004 | Giuseppini |
| 2004/0260678 A1 | 12/2004 | Verbowski et al. |
| 2004/0260973 A1 | 12/2004 | Michelman |
| 2005/0010588 A1 | 1/2005 | Zalewski et al. |
| 2005/0033845 A1 * | 2/2005 | Perepa et al. ................ 709/226 |
| 2005/0050075 A1 | 3/2005 | Okamoto et al. |
| 2005/0055352 A1 | 3/2005 | White et al. |
| 2005/0055386 A1 | 3/2005 | Tosey |
| 2005/0086231 A1 | 4/2005 | Moore |
| 2005/0114381 A1 | 5/2005 | Borthakur et al. |
| 2005/0154695 A1 | 7/2005 | Gonzalez et al. |
| 2005/0187937 A1 | 8/2005 | Kawabe et al. |
| 2005/0188248 A1 | 8/2005 | O'Brien et al. |
| 2005/0216453 A1 | 9/2005 | Sasaki et al. |
| 2005/0228794 A1 | 10/2005 | Navas et al. |
| 2005/0262097 A1 | 11/2005 | Sim-Tang et al. |
| 2006/0004820 A1 | 1/2006 | Claudatos et al. |
| 2006/0015524 A1 | 1/2006 | Gardiner et al. |
| 2006/0224846 A1 | 10/2006 | Amarendran et al. |
| 2006/0259468 A1 | 11/2006 | Brooks et al. |
| 2006/0259527 A1 | 11/2006 | Devarakonda et al. |
| 2006/0277154 A1 | 12/2006 | Lunt et al. |
| 2007/0033191 A1 | 2/2007 | Hornkvist et al. |
| 2007/0043956 A1 | 2/2007 | El Far et al. |
| 2007/0067304 A1 | 3/2007 | Ives |
| 2007/0100867 A1 | 5/2007 | Celik et al. |
| 2007/0185926 A1 | 8/2007 | Prahlad et al. |
| 2007/0203938 A1 | 8/2007 | Prahlad et al. |
| 2007/0282680 A1 | 12/2007 | Davis et al. |
| 2007/0282953 A1 * | 12/2007 | Jain ................. G06Q 10/107 709/206 |
| 2008/0059495 A1 | 3/2008 | Kiessig et al. |
| 2008/0059515 A1 | 3/2008 | Fulton |
| 2008/0077594 A1 | 3/2008 | Ota |
| 2008/0091747 A1 | 4/2008 | Prahlad et al. |
| 2008/0183662 A1 | 7/2008 | Reed et al. |
| 2008/0228771 A1 | 9/2008 | Prahlad et al. |
| 2009/0106375 A1 * | 4/2009 | Carmel et al. ............... 709/206 |
| 2009/0172333 A1 | 7/2009 | Marcu et al. |
| 2009/0228563 A1 * | 9/2009 | Jones et al. .................. 709/206 |
| 2009/0287665 A1 | 11/2009 | Prahlad et al. |
| 2009/0319534 A1 | 12/2009 | Gokhale |
| 2010/0082672 A1 | 4/2010 | Kottomtharayil et al. |
| 2010/0179941 A1 | 7/2010 | Agrawal et al. |
| 2010/0205150 A1 | 8/2010 | Prahlad et al. |
| 2010/0299490 A1 | 11/2010 | Attarde et al. |
| 2011/0178986 A1 | 7/2011 | Prahlad et al. |
| 2011/0181383 A1 | 7/2011 | Lotfi et al. |
| 2012/0215745 A1 | 8/2012 | Prahlad et al. |
| 2012/0254115 A1 | 10/2012 | Varadharajan |
| 2012/0271832 A1 | 10/2012 | Prahlad et al. |
| 2013/0013609 A1 | 1/2013 | Prahlad et al. |
| 2013/0110790 A1 | 5/2013 | Matsumoto et al. |
| 2013/0198221 A1 | 8/2013 | Roark et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |

(56) References Cited

FOREIGN PATENT DOCUMENTS

| | | |
|---|---|---|
| EP | 0981090 A1 | 2/2000 |
| EP | 1174795 | 1/2002 |
| WO | WO-9412944 A1 | 6/1994 |
| WO | WO-9513580 A1 | 5/1995 |
| WO | WO-9912098 A1 | 3/1999 |
| WO | WO-9914692 A1 | 3/1999 |
| WO | WO-0106368 A1 | 1/2001 |
| WO | WO-0193537 A2 | 12/2001 |
| WO | WO-03060774 A1 | 7/2003 |
| WO | WO-2004010375 A3 | 6/2004 |
| WO | WO-2004063863 A3 | 3/2005 |
| WO | WO-2005055093 A2 | 6/2005 |
| WO | WO-2007062254 A2 | 5/2007 |
| WO | WO-2007062429 A2 | 5/2007 |
| WO | WO-2008049023 A2 | 4/2008 |

OTHER PUBLICATIONS

"Text Figures", retrieved from http://www.microsoft.com/msj/1198.ntfs/ntfstextfigs.htm on Nov. 10, 2005, 7 pages.
"Titus Labs—Announces Document Classification for Microsoft Word" Nov. 3, 2005, XP55034835, available at http://web.archive.org/web/20051126093136/http://www.titus-labs.com/about/DocClassRelease.html, 1 page.
Armstead et al., "Implementation of a Campus-wide Distributed Mass Storage Service: The Dream vs. Reality," IEEE, 1995, pp. 190-199.
Arneson, "Mass Storage Archiving in Network Environments," Digest of Papers, Ninth IEEE Symposium on Mass Storage Systems, Oct. 31, 1988—Nov. 3, 1988, pp. 45-50, Monterey, CA.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.
Bhagwan, R. et al. "Total Recall: System Support for Automated Availability Management," Proceedings of the 1st Conference on Symposium on Networked Systems Design and Implementation, vol. 1, 3 Mar. 2004, XP055057350, Berkeley, CA, 14 pages.
Bowman et al. "Harvest: A Scalable, Customizable Discovery and Access System," Department of Computer Science, University of Colorado—Boulder, Revised Mar. 1995, 29 pages.
Brad O'Neill, "New Tools to Classify Data," Storage Magazine, Aug. 2005, 4 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995—Mar. 9, 1995, pp. 420-427, San Francisco, CA.
Eitel, "Backup and Storage Management in Distributed Heterogeneous Environments," IEEE, 1994, pp. 124-126.
EMC Corporation, "Today's Choices for Business Continuity," 2004, 12 pages.
Extended European Search Report for European Application No. EP11003795, Mail Date Nov. 21, 2012, 20 pages.
Farley, M., "Storage Network Fundamentals Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.
Harrison, CDIA Training & Test Preparation Guide 2000, Specialized Solutions, 3 pages.
International Search Report and Written Opinion for International Application No. PCT/US07/81681, Mail Date Nov. 13, 2009, 8 pages.
International Search Report and Written Opinion for International Application No. PCT/US10/62069, Mail Date Mar. 7, 2011, 7 pages.
Jander, M., "Launching Storage-Area Net," Data Communications, US, McGraw Hill, NY, vol. 27, No. 4 (Mar. 21, 1998), pp. 64-72.
Jason Gait, "The Optical File Cabinet: A Random-Access File System for Write-Once Optical Disks," IEEE Computer, vol. 21, No. 6, pp. (Nov. 22, 1988) (see in particular figure 5 in p. 15 and recitation in claim 5).
Jeffrey Cooperstein and Jeffrey Richter, "Keeping an Eye on Your NTFS Drives, Part II: Building a Change Journal Application," Microsoft Systems Journal, Oct. 1999, 14 pages.
Jeffrey Cooperstein and Jeffrey Richter, "Keeping an Eye on Your NTFS Drives: the Windows 2000 Change Journal Explained," Microsoft Systems Journal, Sep. 1999, 17 pages.
Jeffrey Richter and Luis Felipe Cabrera, "A File System for the 21st Century: Previewing the Windows NT 5.0 File System," and attached text figures, Microsoft Systems Journal, Nov. 1998, 24 pages.
Karl Langdon and John Merryman, "Data Classification: Getting Started," Storage Magazine, Jul. 2005, 3 pages.
Microsoft Developer Network, "GetFileAttributes," online library article, [accessed on Nov. 10, 2005], 3 pages.
Microsoft Developer Network, "GetFileAttributesEx," online library article, [accessed on Nov. 10, 2005], 2 pages.
Microsoft Developer Network, "Win32_File_Attribute_Data," online library article, [accessed on Nov. 10, 2005], 3 pages.
PCT International Search Report and Written Opinion for International Application No. PCT/US07/81681, Mail Date Oct. 20, 2008, 11 pages.
Quick Reference Guide for West and East [date unknown, but verified as of Sep. 13, 2007], Search and Information Resource Administration, 2 pages.
Rosenblum et al., "The Design and Implementation of a Log-Structured File System," Operating Systems Review SIGOPS, vol. 25, No. 5, New York, US, pp. 1-15 (May 1991).
Supplementary European Search Report for European Application EP06846386, Dated Dec. 30, 2008, European Patent Office, 6 pages.
Supplementary European Search Report for European Application No. EP07844364, Mail Date Apr. 19, 2011, 9 pages.
Titus Labs Document Classification V1.1 for Microsoft Word—Document Policy Enforcement, avaliable at: <http://web.archive.org/web/20060104112621/wvvw.titus-labs.com/includes/PDF/DocClassDataSheetpdf>, Nov. 3, 2005, 2 pages.
Users Manual for the Examiners Automated Search Tool (East) Jul. 22, 1999, Version 1.0, 179 pages.

\* cited by examiner

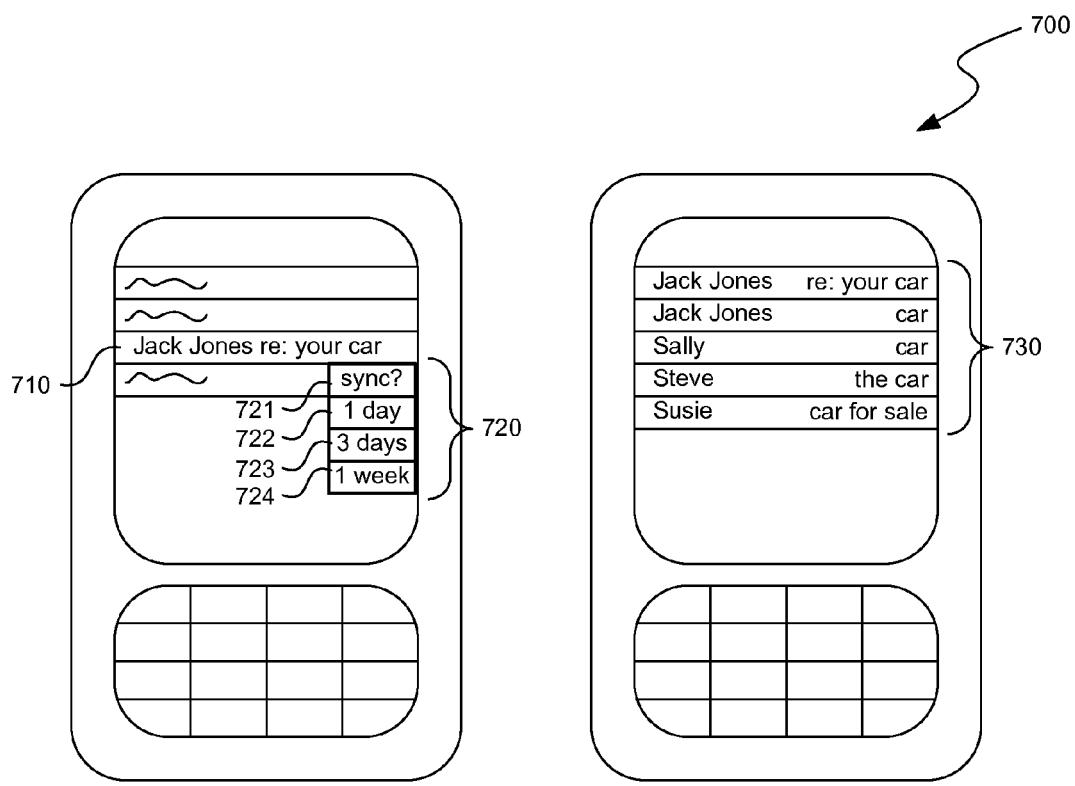
*FIG. 7A*      *FIG. 7B*

METHOD AND SYSTEM FOR DISPLAYING SIMILAR EMAIL MESSAGES BASED ON MESSAGE CONTENTS

CROSS-REFERENCE TO RELATED APPLICATIONS

This application is a divisional of U.S. patent application Ser. No. 12/548,953, filed on Aug. 27, 2009, entitled METHOD AND SYSTEM FOR LEVERAGING IDENTIFIED CHANGES TO A MAIL SERVER which claims priority to U.S. Provisional Patent Application No. 61/093,148, filed on Aug. 29, 2008, entitled METHOD AND SYSTEM FOR LEVERAGING IDENTIFIED CHANGES TO A MAIL SERVER, each of which is incorporated by reference in its entirety.

This application is related to U.S. patent application Ser. No. 11/694,869, filed on Mar. 30, 2007 (now U.S. Pat. No. 7,882,077), entitled "METHOD AND SYSTEM FOR OFFLINE INDEXING OF CONTENT AND CLASSIFYING STORED DATA," and U.S. patent application Ser. No. 11/564,119, filed on Nov. 28, 2006 (now U.S. Pat. No. 7,668,884), entitled SYSTEMS AND METHODS FOR CLASSIFYING AND TRANSFERRING INFORMATION IN A STORAGE NETWORK, each of which is hereby incorporated by reference.

BACKGROUND

Processes that typically copy, backup, or duplicate data, such as Microsoft Exchange data (email messages, mail settings, and so on), are often laborious, time-intensive processes. The typical backup process connects to each user's mailbox and compares the entire contents (i.e., every message) of the mailbox with a previous backup copy of that mailbox. Often, the backup process will access every message in the mailbox to determine if anything has changed since a previous copy process occurred. Then, the backup process can perform a copy or backup operation, only after identifying the changes from the entire mailbox.

Additionally, typical email systems present changes to a user by only updating the user's mailbox with the change (such as by displaying a newly received email message at the top of a list of emails). However, certain emails may be related or similar to other previous messages, and although email systems can sort emails via simple header information (by user, date received, or alphabetically by subject), there are many instances where it may be advantageous to a user to employ an email system that provides other benefits.

There is a need for a system that overcomes the above problems, as well as providing additional benefits.

SUMMARY

Described herein are a system, method and computer-readable storage medium storing instructions for controlling a computer system to perform a method of transferring an email message to a secondary copy of a data store associated with a mailbox. The method includes accessing an event sync file associated with a mailbox, wherein the event sync file includes indications of changes made to electronic mail messages within the mailbox, and creating a change journal to include entries associated with the changes made to the electronic mail messages within the mailbox. The method further includes identifying the changes made to the electronic mail messages within the mailbox from information within the change journal entries, and transferring the changes to the electronic mail messages within the mailbox to a secondary copy of data associated with the mailbox.

BRIEF DESCRIPTION OF THE DRAWINGS

FIG. 7A illustrates a display screen on a mobile device.

FIG. 7B illustrates the display screen of FIG. 7A modified based on a change to a mailbox.

DETAILED DESCRIPTION

Overview

Figure 1:
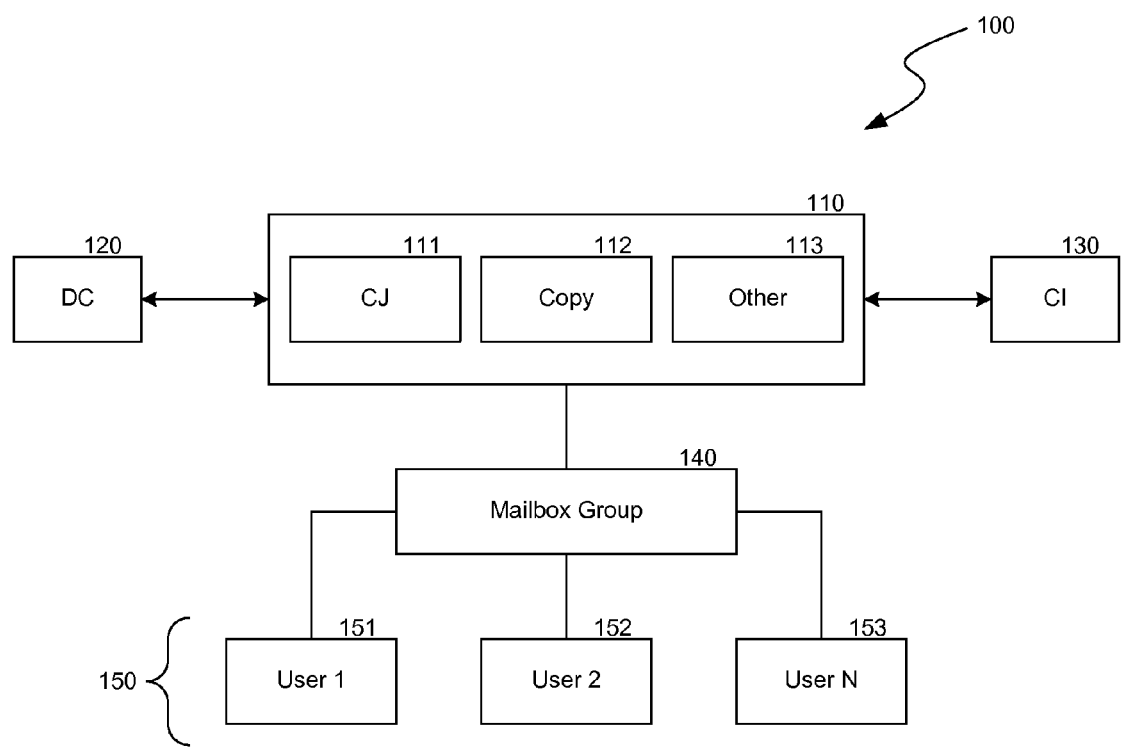
FIG. 1 is a block diagram illustrating a data storage system for creating a secondary copy of data files having individual discrete data objects, such as emails in a Microsoft Exchange mailbox.

A method and system for identifying, copying, and leveraging changes to a data set, such as a data set on a Microsoft Exchange or other mail server, is disclosed. The system receives an alert or other signal from a mail server indicating a change to a data set at the mail server, stores an indication of the event in a log or other data structure, queries the log for information related to the event, and performs (or, initiates) a data storage operation based on results of the query.

For example, when an email message is deleted by a user in Microsoft Outlook, a supporting Exchange Server updates a synchronization file (such as an Event Sync file) to indicate that an event (such as an SMTP event), the deletion, has occurred within the user's mailbox. The system accesses the synchronization file, identifies the event, and stores information about the event (such as path information related to the location of the event and the type of event) into a log file, or change journal. Later, a data storage component accesses the change journal, queries the change journal to identify changes that have occurred during a certain time period (such as since the last data storage operation), and uses the results of the query to determine changes to the mailbox, and copies or performs a backup of the changes. A change to a mailbox may be a received message, a moved message (such as from one folder to another), a deleted message, and so on.

In some examples, the system updates an index of content based on and after identifying changes to a mailbox via a change journal. A content indexing system may update an index associated with a mailbox or other data store by accessing the change journal to identify changes to the mailbox and indexing content related to those changes.

In some examples, the system updates an index of data classification based on and after identifying changes to a mailbox via a change journal. A data classification system may update an index associated with a mailbox or other data store by accessing the change journal to identify changes to the mailbox, and classifying data related to those changes.

In some examples, an email system may update, present, or modify the contents of a mailbox based on identifying changes to the mailbox. The email system may extract the content or classification of data within a changed email message, associate other messages similarly classified or containing similar content, and modify the mailbox to present the associated messages along with the changed message to a user. The system may synchronize a mailbox on a mobile device based on a change to the mailbox. In some cases, the system may modify the presentation of a mailbox to a user based on a change to the mailbox. The system may perform one or more actions based on a change to the mailbox.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

The system may create a secondary copy of a data set, such as a storage group containing one or more mailboxes, as part of an existing backup schedule performed by an organization. For example, an organization may perform weekly backups that contain a complete copy of the organization's email data. The system may create secondary copies using various data storage operations, such as snapshots, continuous data replication, and so on. Secondary copies may include backup copies, auxiliary copies, archive copies, and so on.

Referring to FIG. 1, a block diagram illustrating a data management system 100 for creating a secondary copy of Microsoft Exchange data is shown. FIG. 1 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

The data management system 100 includes a data storage system 110 in communication with a mailbox group 140 that contains one or more mailboxes 150, such as a user1 mailbox 151, a user2 mailbox 152, and a userN mailbox 153. For example, the mailbox group may be a Microsoft Exchange group that manages various user mailboxes 150. The data storage system 110 and the mailbox group 140 may communicate over wired or wireless connections, such as via a storage network.

The data storage system 110 may include a log component 111, such as a component that stores a change journal, a copy component 112 that initiates or facilitates the performance of data storage operations, and other components 113, such as components that communicate with a data classification system 120, a content indexing component 130, and/or other components under management by the system.

The copy component 112 may transfer data to other components (not shown) of the data storage system 100 that transfer data to secondary storage media, such as magnetic tape, optical disks, solid-state media, and so on. The data storage system may contain some or all of the following components, depending on the needs of the system. For example, the data storage system 100 may contain a storage manager, one or more clients, one or more media agents, and one or more storage devices. The storage manager controls the media agents, which are responsible for transferring data to storage devices. The storage manager includes a jobs agent, a management agent, a database, and/or an interface module. The storage manager communicates with client(s). One or more clients may access or receive data to be stored by the system from a database via a data agent. For example, the clients may access data from one or more of the mailboxes 150 upon receiving instructions from the copy component 112. The system uses media agents, which contain databases, to transfer and store data into storage devices. The client databases may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. Additionally, some resources may create indices and other tables relied upon by the data storage system and other data recovery systems. The secondary copies may include snapshot copies and associated indices, but may also include other backup copies such as HSM copies, archive copies, and so on. The resources may also perform storage management functions that may communicate information to higher level components, such as global management resources within a federated data storage system. Further details regarding suitable data storage systems may be found in commonly-assigned U.S. patent application Ser. No. 11/982,324, filed on Oct. 31, 2007, entitled SYSTEMS AND METHODS OF HIERARCHICAL STORAGE MANAGEMENT, SUCH AS GLOBAL MANAGEMENT OF STORAGE OPERATIONS, which is incorporated by reference it its entirety.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical location in which to transfer, store or copy data from a source to a destination data store, such as storage media. Storage policies may be stored in the storage manager, or may be stored in other resources, such as a global manager, a media agent, and so on.

The log component 111 may access and/or communicate with components associated with a mail server, such as an event sync component, in order to identify changes in a data set. The log component 111 may create, update, modify, and/or store one or more logs of content, such as change journals. A change journal stores a journal entry whenever data is changed within a computer system. The change journal generally contains a step-by-step, sequential, or ordered log of what data changed and how the data changed that can be processed at a later time to recreate the current state of the data.

In some examples, the log component 111 stores a journal entry upon identifying a change within storage group 140. For example, the log component may access the event sync file of an Exchange server and store journal entries for all events identified in the event sync file.

Additionally, the log component 111 (or a separate component), may create an associated log or other data structure to parse the data within the change journal. For example, the log component 111 may create a SQL-based file to later query the SQL-based file when required, such as when a backup of a mailbox is to be performed.

Backing Up a Mailbox Based on Changes to the Mailbox

As discussed herein, there is a standard mechanism in Microsoft Exchange, called an event sync mechanism, that sends a signal whenever there is a change in a mail server or storage group, such as a mail being sent, deleted, moved, or received. As discussed herein, aspects of the data storage system leverage the event sync mechanism (and other similar mechanisms) in order to quickly and efficiently copy and/or backup a storage group, such as a collection of mailboxes.

Figure 2:
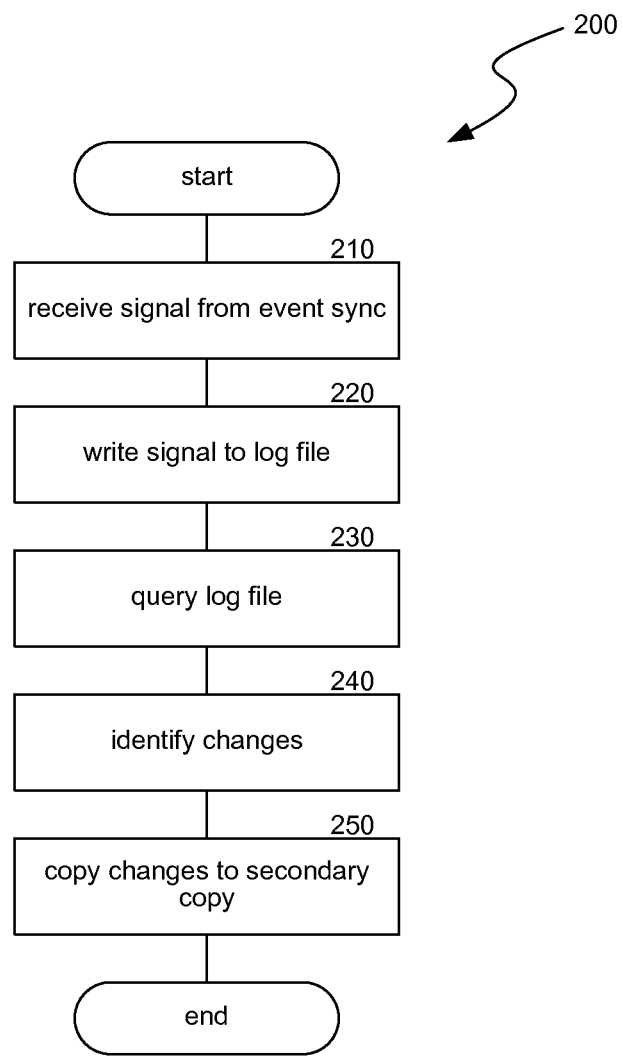
FIG. 2 is a flow diagram illustrating a routine for copying Microsoft Exchange data.

Referring to FIG. 2, a flow diagram illustrating a routine 200 for copying Microsoft Exchange data is shown. In step 210, the system receives a signal from a sync mechanism associated with a mail server, such as the event sync mechanism associated with an Exchange server. The signal indicates an event has occurred within a storage group, such as within the user1 mailbox 151. The event may be a message has been received at the mailbox, a message has been moved within the mailbox, a message has been deleted from the mailbox, and so on. The system may include a component, such as log component 111, located between a mail server, such as storage group 140, and a sync mechanism for the mail server, in order to receive signals intended for the sync mechanism. Alternatively, the log component 111 may access a sync mechanism to extract events, such as events that have occurred in a certain time period.

In step 220, the system writes the signal indicating the event to a log file, such as a change journal stored within the log component 111. For example, the system creates a journal entry for every event indicated by the sync mechanism. The journal entry may include path information for the event (such as an identification of the mailbox, a date and time of the event, and so on) and event information (such as the type of event). Further details regarding a log file are discussed with respect to FIG. 3.

Figure 3:
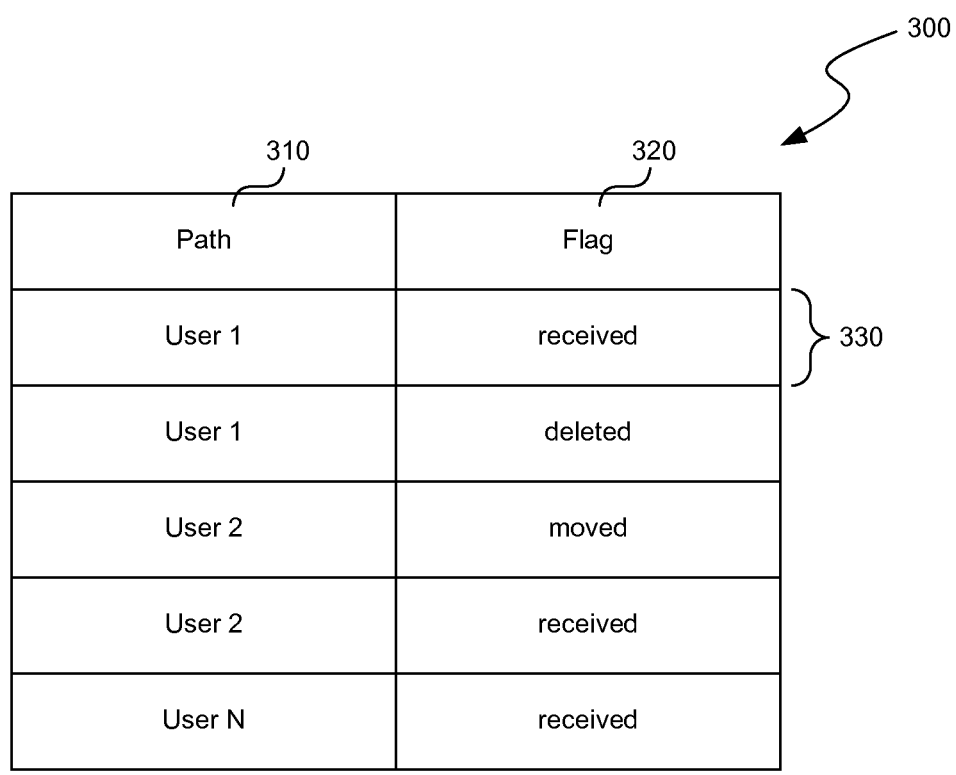
FIG. 3 is a table illustrating a data structure containing log entries of changes to a mailbox.

Referring to FIG. 3, a table illustrating a data structure 300 containing log entries of changes to a mailbox is shown. The data structure 300 includes journal entries for changes within a mailbox for a given period of time. The entries may include path information 310 for the change and flag information 320 that indicates the type of change. For example, the entry 330 indicates a change corresponding to the user1 mailbox 151 receiving a message. Of course, the data structure may include other information not shown in the Figure.

In step 230, the system queries the log file to extract information. In some cases, the system may transfer the log file information to a local table, such as a SQL database, and query the SQL database to extract information. For example, the system may query the SQL database to determine what changes have occurred from a first time to a second, later time.

In step 240, the system receives results of the query, such as an identification of all changes that occurred within the mailbox between a first time and a second time. For each change, the system may indicate a path to the change, and a type of the change, as shown in data structure 300.

In step 250, the system performs a data storage operation associated with the identified changes within the mailbox. For example, the system may transmit the extracted path information 310 and corresponding type information 320 of a received message (an identified change) to the copy component 112, which may then instruct other data storage components to create or update a secondary copy that includes the contents of the received message, as discussed herein.

Indexing the Content of Changes to a Mailbox

In some examples, the system updates an index of content associated with a data store, such as a mailbox, based on identifying changes to the mailbox as described herein. Once the system identifies changes to a mailbox, the system may then index the content of the messages, and then update an index associated with the mailbox.

In some cases, the content indexing system 130 may update a content index according to an indexing policy. An indexing policy is a data structure that stores information about the parameters of an indexing operation. For example, an organization may copy changes to a mail server on a daily basis, and may create an indexing policy that specifies that the index is updated on a daily basis, even if backup operations are not performed daily.

The content indexed by the content indexing system 130 may be some or all content associated with an email message. Some example content to be indexed includes sender information, recipient information, subject information, message type (such as a sent or received message), text within the body of the message, attachment information (such as name or size of the attachment, or content within the attachment), and other metadata associated within the message.

Figure 4A:
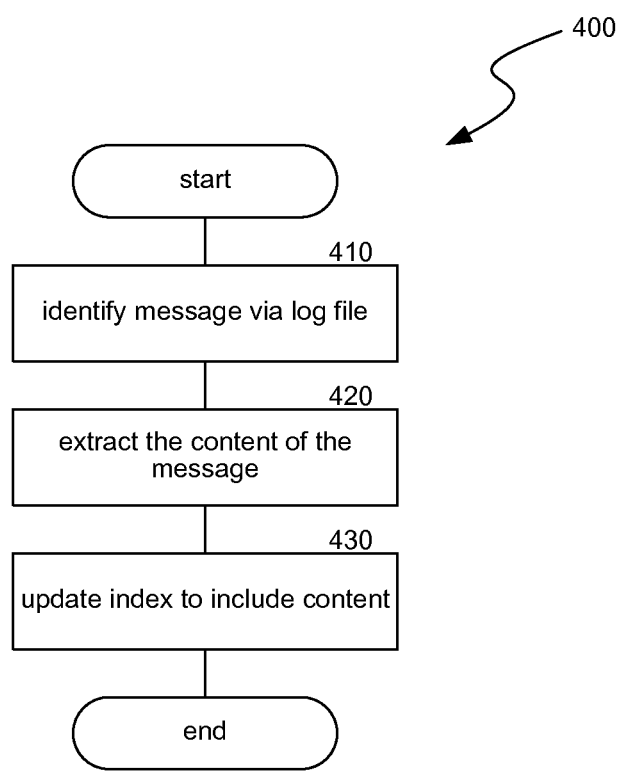
FIG. 4A is a flow diagram illustrating a routine for updating an index of content.

Referring to FIG. 4A, a flow diagram illustrating a routine 400 for updating an index of content for a mailbox is shown. In step 410, a context indexing system 130 identifies a message to be indexed within a log file that stores changes to a mailbox. For example, the content indexing system 130 may access a change journal 300 and identify entries containing path and type information for changes to a mailbox.

In step 420, the content indexing system accesses the messages identified by the path and type information, and indexes the content of the messages. For example, the content indexing system extracts data associated with the sender, recipient, and subject line for all received messages within the change journal. Further details regarding the indexing of content may be found in U.S. patent application Ser. No. 11/694,869, filed on Mar. 30, 2007, entitled "METHOD AND SYSTEM FOR OFFLINE INDEXING OF CONTENT AND CLASSIFYING STORED DATA," which is incorporated by reference in its entirety.

In step 430, the content indexing system updates the index to include the indexed content. For example, the content indexing system creates entries to an index associated with the mailbox for all received messages, modifies entries to the index for all moved messages, and deletes entries to the index for all deleted messages. Thus, the content indexing system 130 may leverage the change journal to update an index associated with a mailbox. The content index may then facilitate content specific presentations of mail messages to users, to be discussed herein.

Classifying the Data within Changes to a Mailbox

In some examples, the system updates an index for a data store to include a classification of data associated with changes to a mailbox. The index may describe certain pertinent aspects of the mailbox that allow a user or system process to consult the index to obtain information regarding the mailbox. For example, the data classification system 120 may traverse messages identified by the change journal and obtain certain characteristics and other attributes of data within the mailbox. Such an index may be a collection of metadata and/or other information regarding the mailbox, and may be referred to herein as a "metabase." Generally, metadata refers to data or information about data, and may include, for example, data relating to storage operations or storage management, such as data locations, storage management components associated with data, storage devices used in performing storage operations, index data, data application type, or other data.

With this arrangement, if it is desired to obtain information regarding the mailbox or characteristics of messages within the mailbox, a system administrator or system process may simply consult the metabase for such information rather than iteratively access and analyze each data item in the network. This may significantly reduce the amount of time required to obtain message information by substantially eliminating the need to obtain information from the source message. Such a data classification system may associate previously stored messages with newly received or modified messages in a mailbox via the data classification index. For example, the index may associate messages based on various classifications, such as message owners (individuals or groups), content of the messages, resources used to create the messages, aging information, and so on.

Figure 4B:
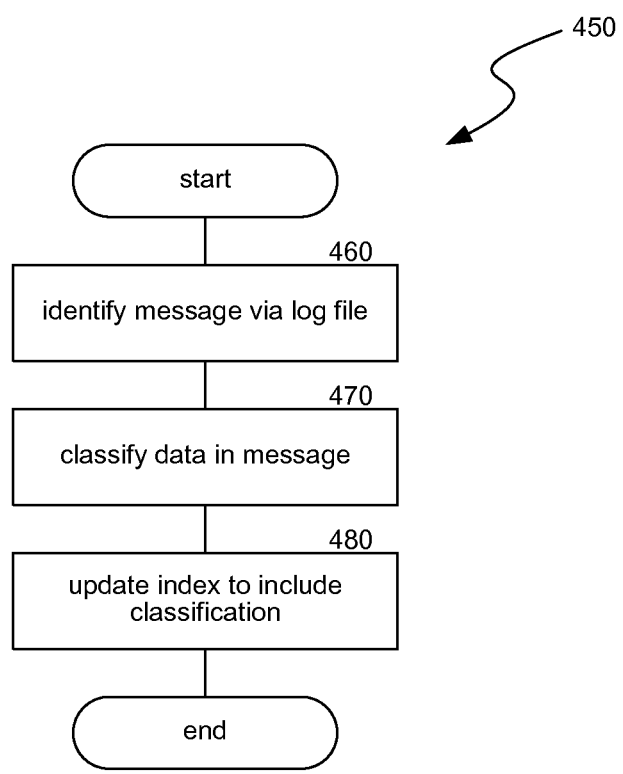
FIG. 4B is a flow diagram illustrating a routine for updating an index of data classification information.

Referring to FIG. 4B, a flow diagram illustrating a routine 450 for updating an index of data classification information is shown. In step 460, a data classification system 120 identifies a message that includes data to be classified within a log file that stores changes to a mailbox. For example, the data classification system 120 may access a change journal 300 and identify entries containing path and type information for changes to a mailbox.

In step 470, the data classification system accesses the messages identified by the path and type information, and classifies data within the messages. For example, the data classification system may traverse the identified messages to obtain certain information regarding the messages such as any available metadata. Such metadata may include information about messages or characteristics associated with data within the messages such as the data owner (e.g., the client or user that generates the data or other data manager), the last modified time (e.g., the time of the most recent modification), the data size (e.g., number of bytes of data), information about the data content (e.g., the application that generated the data, the user that generated the data, etc.), to/from information (e.g., an email sender, recipient or individual or group on an email distribution list), creation date (e.g., the date on which the data was created), file type (e.g., format or application type), last accessed time (e.g., the time the data was most recently accessed or viewed), application type (e.g., the application which generated the data), location/network (e.g., a current, past or future location of the data and network pathways to/from the data), frequency of change (e.g., a period in which the data is modified), business unit (e.g., a group or department that generates, manages or is otherwise associated with the data), and aging information (e.g., a schedule, which may include a time period, in which the data is migrated to secondary or long term storage), and so on. Further details regarding the indexing of content may be found in U.S. patent application Ser. No. 11/564,119, filed on Nov. 28, 2006, entitled SYSTEMS AND METHODS FOR CLASSIFYING AND TRANSFERRING INFORMATION IN A STORAGE NETWORK, which is incorporated by reference in its entirety.

In step 480, the data classification system updates the index to include the classification information, such as the information described above. Thus, the data classification system 120 may leverage the change journal to update an index associated with a mailbox. The data classification index may then facilitate content specific presentations of mail messages to users, to be discussed herein.

Presenting a Mailbox Based on Changes to the Mailbox

In some examples, the system facilitates the presentation of messages within a mailbox based on the content of a change to the mailbox. For example, the system may present messages along with a received message that contain content similar to the content within the received message.

Figure 5:
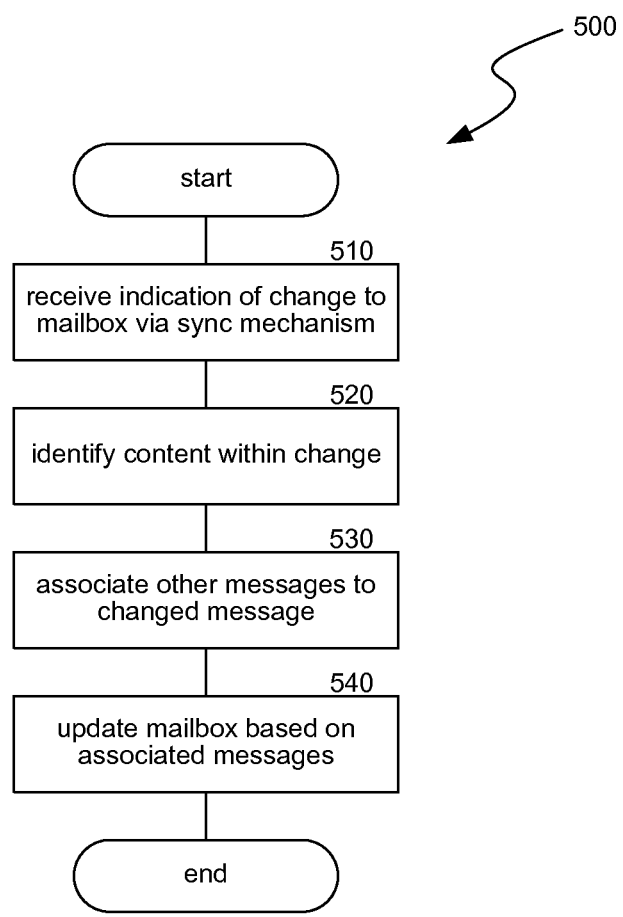
FIG. 5 is a flow diagram illustrating a routine for updating a mailbox based on a change to the mailbox.

Referring to FIG. 5, a flow diagram illustrating a routine 500 for updating a mailbox based on a change to the mailbox. In step 510, the system receives an indication of a change to a mailbox via a sync mechanism, such as event sync. The system may identify a message corresponding to the change, such as a newly received message within the mailbox.

In step 520, the system identifies content within the change to the mailbox. The system may look to a content index or classification index (or may first index or classify the message) to determine content associated with the message. For example, the system may identify information within the subject line of a message.

In step 530, the system associates other messages within the mailbox with the change to the mailbox. For example, the system may look to an index of content, identify the other messages within the mailbox that contain a subject line similar to the subject line for a newly received message, and associate the other messages to the newly received message. Further details regarding the association of messages will be described below.

In step 540, the system updates the presentation of the mailbox based on the associated messages. For example, the system may present the associated messages along with the newly received message, may provide a link or other indication that identifies the associated messages, may sort an inbox or other folder within the mailbox to order messages based on the content of the new message or the associated messages, and so on.

Figure 6:
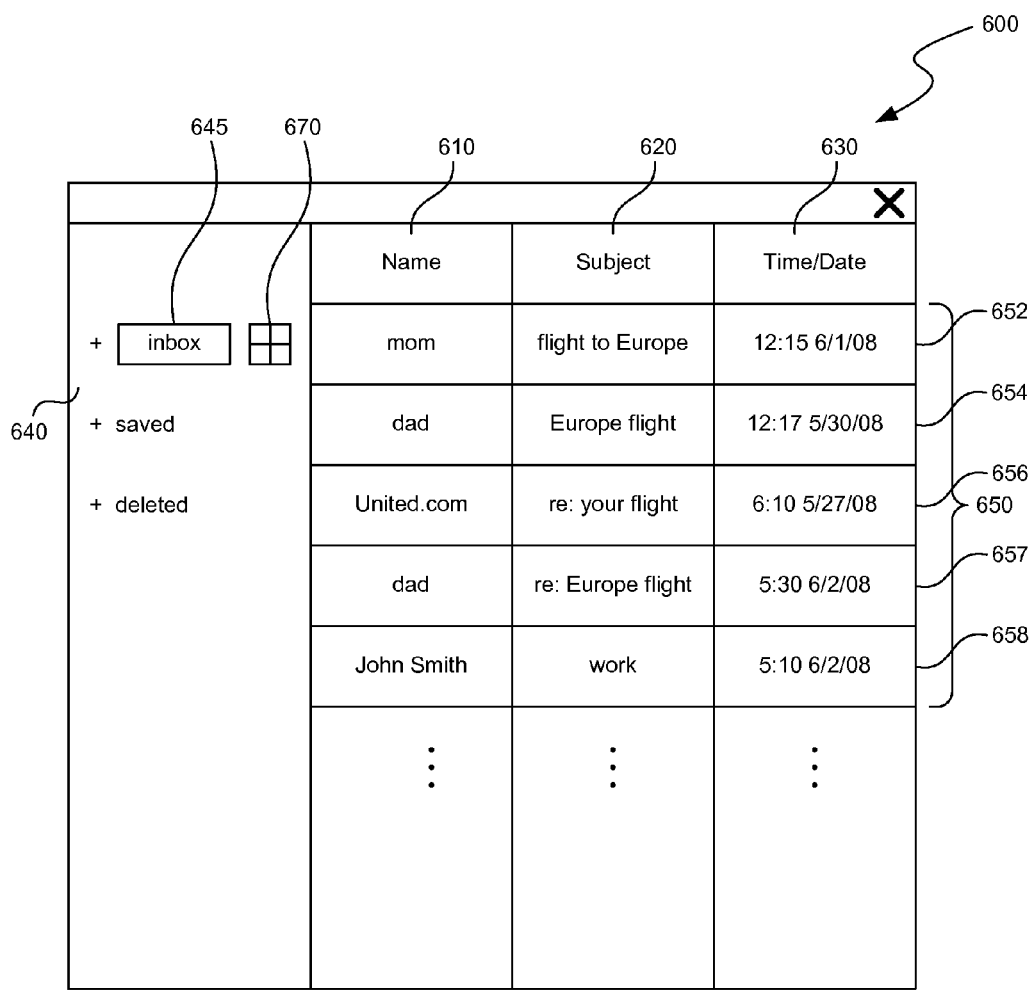
FIG. 6 illustrates a mailbox presenting a list of messages to a user based on content of a received message.

For example, FIG. 6 illustrates a mailbox 600 presenting a list of messages to a user based on the content of a received message. The mailbox 600 presents messages to a user via certain message identification information, such as information associated with a name of a sender 610, information associated with a subject of the message 620, information associated with a date/time received 630, and so on. The mailbox may include a number of folders 640, including an inbox 645 presented in the Figure. The inbox contains a number of messages 650, such as a newly received message 652 from "Mom" entitled "flight to Europe," and a number of messages associated based on content with message 652. For example, message 654 includes the subject "Europe flight," and message 656 includes the subject "re: your flight." The inbox may also include message 657 from "dad" regarding "Europe flight". The inbox may include unassociated messages, such as message 658.

In this example, the system presents the newly received message 652 along with messages determined to be associated with the newly received message, based on the content of the newly received message. The system leverages the event sync system and change journal discussed herein to determine that the mailbox has received a new message and to index the content of the new message without requiring access to all the messages within the mailbox. The system can then associate messages with the newly received message via the index of content and present these messages along with the newly received message.

Thus, unlike typical systems that can only sort messages based on a limited number of fields, the system described herein is capable of providing a user with numerous advantages when a change to a mailbox occurs. In the above example, the system provides a user with previous messages that may relate to a newly received message, providing contextual and historical information for the newly received message. Even though the associated messages have different subject lines, they have similar content within the subject lines (or within other fields of the messages), and the system, via a content index, can associate the messages based on the similar content. This enables the system to display messages to a user that may be similar in content but are otherwise unassociated (that is, they are not part of an email string, they do not contain the exact same subject line, and so on) when a new message is received at the mailbox.

In some examples, the system may display an indication that there are messages associated with a newly received message. For example, after creating a change journal for changes to a mailbox, the system may display an indicator 670 proximate to a newly received message 652, indicating to a user that other messages stored within the mailbox include similar content. This can be helpful when a user receives a message related to a subject long after any previous correspondence was received for that subject. The user may wish to quickly determine the importance of the message, but may not wish to view all the associated messages. The indicator 670 may link to or expand the view to include the associated messages.

In some cases, a user may access a mailbox via a mobile device that presents messages pushed to the mobile device via an enterprise server. Due to the limited display space on mobile devices, the user may wish to only receive and/or view certain messages on his/her mobile device, or may wish to retrieve certain messages that are stored within the user's mailbox, but have been deleted from the user's mobile device.

FIG. 7A illustrates a display screen 700 on a mobile device that presents one or more messages 710 to a user. An email program presents a newly received message, such as message 710 from "Jack Jones" entitled "Re: Your Car." The user, away from his work computer, may wish to view on his mobile device other messages related to his car that he received in a certain time period. The system may present a selection toolbar 720 that presents options such as to sync 721 the device to include other messages associated with the received message, may ask for a certain time period of received messages 721-724, and so on. Upon receiving a selection from the user, the system may retrieve any associated messages that satisfy the user's request, and present them to the user, shown as display 730 in FIG. 7B.

FIG. 7B illustrates the display screen of FIG. 7A modified based on a change to a mailbox. In the example above, the user received a new message about his car, and caused the system to sync the device to receive any associated messages. The system transfers a number of different messages and displays them as view 730. They are associated with the new message via content index or classification index described herein. Thus, the system facilitates the user to retrieve messages quickly and efficiently to his mobile device when a new message is received at the mobile device.

Other example processes facilitated by the system may include the following:

Upon deletion of an email message from a user's mobile device, the system identifies the change to the mailbox and identifies other email messages associated with the deleted email message, and deletes the associated messages. In some cases, the system may request authorization from the user before deleting the messages.

When a user moves a message to a different folder (such as a folder for a specific project), the system identifies the change to the mailbox and identifies other email messages associated with the moved email messages, and moves the other email messages to the folder.

Upon receiving a new message, the system may display all messages associated with the new message, and may create a new folder for the group of messages when requested by a user. These messages may be from different folders (inbox, sent messages, deleted messages, other folders). The system may facilitate building a historical context for a received message, and then storing the messages (or additional copies of the messages or portions of the messages) within a specific folder. This may enable a user to build a quick history of a certain subject when a new email message is received in order to provide the user with information that may assist the user in responding to the message, among other benefits.

In addition, the system may generate reports based on information extracted from the change journal. For example, the system may generate reports for a given time period of changes, the content within the changes and so on. The reports may identify changes associated with messages having similar data classifications, changes associated with messages having similar content, and so on. Components within the system may leverage information with the reports to update or modify storage operations, periodically or dynamically.

Conclusion

From the foregoing, it will be appreciated that specific embodiments of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. At least one non-transitory, tangible computer-readable medium storing instructions which, when executed by a computing system, cause the computing system to perform a method for displaying email messages to a user, the method comprising:
   receiving an indication of a message received at a mailbox associated with the user;
   generating a journal entry associated with the received message,
      wherein the journal entry is part of a change journal that tracks changes made to the mailbox associated with the user, and
      wherein the journal entry includes a path to the received message;
   extracting content associated with the received message via the path to the received message;
   accessing an index of content associated with indexing content within messages received at the mailbox associated with the user;
   identifying, via the index of content, other messages contained in the mailbox having content similar to the extracted content; and
   presenting the received message along with information associated with the identified other messages to the user.

2. The at least one non-transitory, tangible computer-readable medium of claim 1, wherein presenting the received message includes presenting at least one identified other message directly above or below the received message in a presented list of messages, wherein the at least one identified other message resides in a folder of the mailbox different from a folder of the mailbox that receives the received message.

3. The at least one non-transitory, tangible computer-readable medium of claim 1, wherein presenting the received message includes presenting an indication that other messages contain content similar to the content of the received message.

4. The at least one non-transitory, tangible computer-readable medium of claim 1, wherein the other messages are stored in secondary storage, while the received message is stored in primary storage.

5. A method for displaying email messages to a user, the method comprising:
   receiving an indication of a message received at a mailbox associated with the user;

generating a journal entry associated with the received message, wherein the journal entry includes a path to the received message;

extracting content associated with the received message;

identifying other messages contained in the mailbox having content similar to the extracted content, wherein at least one of the identified other messages is not part of an email string of messages that includes the message received at the mailbox associated with the user; and presenting the received message along with information associated with the identified other messages to the user.

6. The method of claim 5, wherein presenting the received message includes presenting at least one identified other message directly above or below the received message in a presented list of messages, wherein the at least one identified other message resides in a folder of the mailbox different from a folder of the mailbox that receives the received message.

7. The method of claim 5, wherein presenting the received message includes presenting an indication that other messages contain content similar to the content of the received message.

8. The method of claim 5, wherein the other messages are stored in secondary storage, while the received message is stored in primary storage.

9. A method for displaying email messages to a user of a mobile device, the method comprising:

receiving an indication of a message received at a mailbox associated with the mobile device;

extracting content associated with the received message;

identifying other messages contained in the mailbox having content similar to the extracted content, wherein at least one of the identified other messages is not part of an email string of messages that includes the message received at the mailbox associated with the user; and presenting the received message along with information associated with the identified other messages to the user via a display of the mobile device.

10. The method of claim 9, wherein presenting the received message includes presenting a symbol indicating that other messages contain content similar to the extracted content of the received message.

11. The method of claim 9, wherein presenting the received message includes:

transferring one or more other messages to the mobile device, wherein the one or more other messages contain content similar to the content of the extracted content of the received message; and displaying the transferred one or more other messages to the user via the display of the mobile device.

12. The method of claim 9, wherein presenting the received message is based on:

access of a change journal that include entries associated with changes made to messages within the mailbox, wherein the entries of the change journal do not include copies of data changed in a remote data store; and wherein at least some of the entries include type information for changes in the data store.

13. The method of claim 9, wherein the other messages are stored in secondary storage, while the received message is stored in primary storage.

14. At least one non-transitory, tangible computer-readable medium having instructions that cause a processor to perform a method of displaying email messages to a user of a mobile device, the method comprising:

receiving an indication of a message received at a mailbox associated with the mobile device;

extracting content from the body of the received message or the subject of the received message;

identifying other messages contained in the mailbox having content within the body of the messages or the subjects of the received messages that is similar to the extracted content, wherein at least one of the identified other messages is not part of an email string of messages that includes the message received at the mailbox associated with the user; and presenting the received message along with information associated with the identified other messages to the user via a display of the mobile device.

15. The at least one non-transitory, tangible computer-readable medium of claim 14, wherein presenting the received message includes presenting a symbol indicating that other messages contain content similar to the extracted content of the received message.

16. The at least one non-transitory, tangible computer-readable medium of claim 14, wherein presenting the received message includes:

transferring one or more other messages to the mobile device, wherein the one or more other messages contain content similar to the content of the extracted content of the received message; and displaying the transferred one or more other messages to the user via the display of the mobile device.

17. The at least one non-transitory, tangible computer-readable medium of claim 14, wherein presenting the received message is based on:

access of a change journal that include entries associated with changes made to messages within the mailbox, wherein the entries of the change journal do not include copies of data changed in a remote data store; and wherein at least some of the entries include type information for changes in the data store.

18. The at least one tangible computer-readable medium of claim 14, wherein the other messages are stored in secondary storage, while the received message is stored in primary storage.

* * * * *

UNITED STATES PATENT AND TRADEMARK OFFICE
CERTIFICATE OF CORRECTION

PATENT NO. : 9,509,652 B2  
APPLICATION NO. : 13/759283  
DATED : November 29, 2016  
INVENTOR(S) : Jun H. Ahn et al.

Page 1 of 1

It is certified that error appears in the above-identified patent and that said Letters Patent is hereby corrected as shown below:

On the Title Page

On the page 4, in Column 2, under "Other Publications", Line 52, delete "avaliable" and insert -- available --, therefor.

In the Claims

In Column 14, Line 51, Claim 18, after "one" insert -- non-transitory, --.

Signed and Sealed this
Twenty-eighth Day of February, 2017

Michelle K. Lee
*Director of the United States Patent and Trademark Office*